United States Patent [19]
Lai

[11] Patent Number: 5,601,075
[45] Date of Patent: Feb. 11, 1997

[54] SOLAR ENERGY COLLECTING SYSTEM

[76] Inventor: Herman Lai, No. 25, Ta Gin Street, Taichung, Taiwan

[21] Appl. No.: 506,014

[22] Filed: Jul. 24, 1995

[51] Int. Cl.$^6$ ........................................ F24J 2/40
[52] U.S. Cl. ..................... 126/585; 126/596; 126/597; 126/587
[58] Field of Search .................... 126/585, 587, 126/596, 597

[56] References Cited

U.S. PATENT DOCUMENTS

| | | | |
|---|---|---|---|
| 3,931,806 | 1/1976 | Hayes | 126/587 |
| 3,998,207 | 12/1976 | Watt | 126/587 |
| 4,125,107 | 11/1978 | Nurnberg | 126/587 |
| 4,191,166 | 3/1980 | Saarem et al. | 126/597 X |
| 4,397,301 | 8/1983 | Onno | 126/597 X |

Primary Examiner—Larry Jones
Attorney, Agent, or Firm—Charles E. Baxley, Esq.

[57] ABSTRACT

A solar energy collecting system includes a water tank and a solar collector and a pump for pumping water from the water tank to the solar collector. A sensor is arranged close to the solar collector. A CPU is connected to the pump and the temperature sensor in order to circulate the water according to the water temperature at the inlet of the solar collector. The water can be circulated in a fast speed when at noon. The water may be heated with a lengthened heating time and may be heated with a smaller temperature difference so as to effectively collect solar energy.

2 Claims, 2 Drawing Sheets

5,601,075

SOLAR ENERGY COLLECTING SYSTEM

BACKGROUND OF THE INVENTION

1. Field of the Invention

The present invention relates to a solar collector, and more particularly to a solar energy collecting system.

2. Description of the Prior Art

Typical energies in earth have become less such that solar collectors have been developed for collecting the solar energy in order to substitute the other energies. One type of the solar collectors provides a sensor engaged in the tube of the solar collector so as to sense the temperature of the fluid. When the sensor is lower then a predetermined value, for example, 50° C., the solar collector is stopped and may not collect the solar energy. However, a great amount of the solar energy can not be suitably collected.

The other type of the solar collector includes a sensor engaged in the tube of the solar collector and includes another sensor engaged in the water tank which is provided for collecting the heated water. The solar collector may be energized and may be operated only when the temperature difference between the two sensors reaches a predetermined temperature difference, 20° C. for example. If the temperature difference does not reach the predetermined value, the solar collector can not be energized. However, similarly, a great amount of the solar energy can not be suitably collected.

The present invention has arisen to mitigate and/or obviate the afore-described disadvantages of the conventional solar collectors.

SUMMARY OF THE INVENTION

The primary objective of the present invention is to provide a solar energy collecting system which may suitably collect the solar energy, particularly when the sun is not located directly above the solar collector.

In accordance with one aspect of the invention, there is provided a solalr energy collecting system comprising at least one water tank for receiving water therein, at least one solar collector for heating the water and for collecting solar energy, a pipe coupling the water tank to the solar collector for supplying water from the water tank to the solar collector, a pump means for pumping water from the water tank to the solar collector, a hose coupling the solar collector to the water tank for receiving heated water in the water tank from the solar collector, a temperature sensor means engaged in the pipe and arranged close to the solar collector, and a processing means connected to the pump and the temperature sensor, the processing means including an initial temperature difference and including a temperature difference decreasing value so as to decrease the initial temperature difference step by step, and processing means including an initial heating time and including a heating time increasing value so as to lengthen the initial heating time and in order to effectively collect solar energy.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
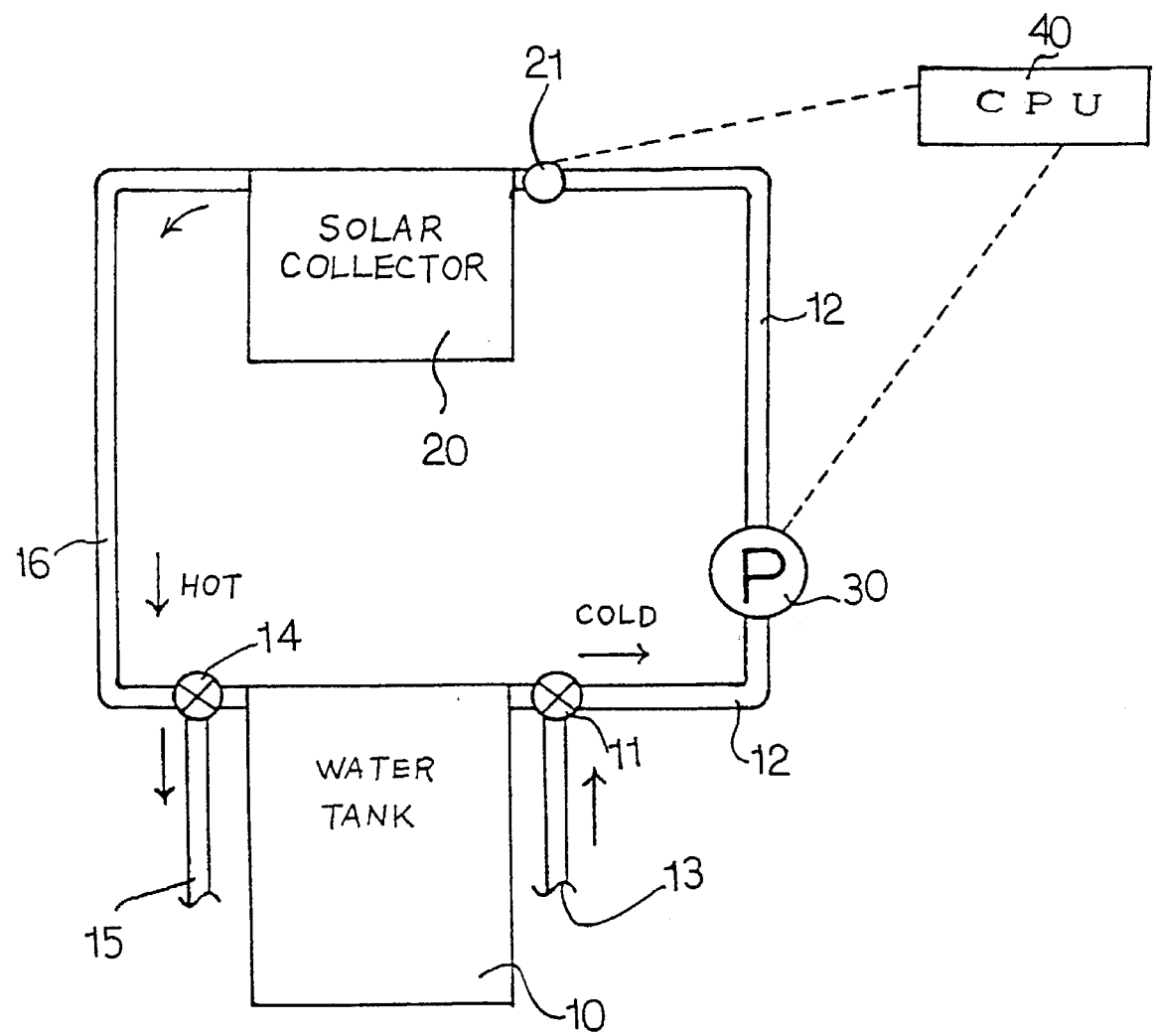
FIG. 1 is a schematic view of a solar energy collecting system in accordance with the present invention.

Referring to the drawings, and initially to FIG. 1, a solar energy collecting system in accordance with the present invention comprises at least one water tank 10 for receiving water therein and particularly for receiving the heated water therein, and comprises at least one solar collector 20. A pipe 12 couples the water tank 10 to the solar collector 20 for supplying the water received in the water tank 10 into the solar collector 20. A pump 30 is engaged in the pipe 12 for pumping the water from the water tank 10 into the solar collector 20 so as to be heated by the solar collector 20. A hose 16 couples the solar collector 20 to the water tank 10 for supplying the water heated by the solar collector 20 to the water tank 10. A three-way valve 11 is engaged in the pipe 12 and arranged close to the water tank 10 for controlling the water flowing from the water tank 10 to the solar collect or 20. A tube 13 is coupled to the valve 11 for supplying fresh water into the solar collecting system. Another three-way valve 14 is engaged in the hose 16 and arranged close to the water tank 10 for controlling the water flowing from the solar collector 20 to the water tank 10. A tube 15 is coupled to the valve 14 for discharging the heated water stored in the water tank 10. A temperature sensor 21 is engaged in the pipe 12 and arranged close to the solar collector 20 for sensing the temperature of the water flowing into the solar collector 20. A microprocessor or a central processing unit 40 (abbreviated as CPU hereinafter) is connected to the temperature sensor 21 and the pump 30.

Figure 2:
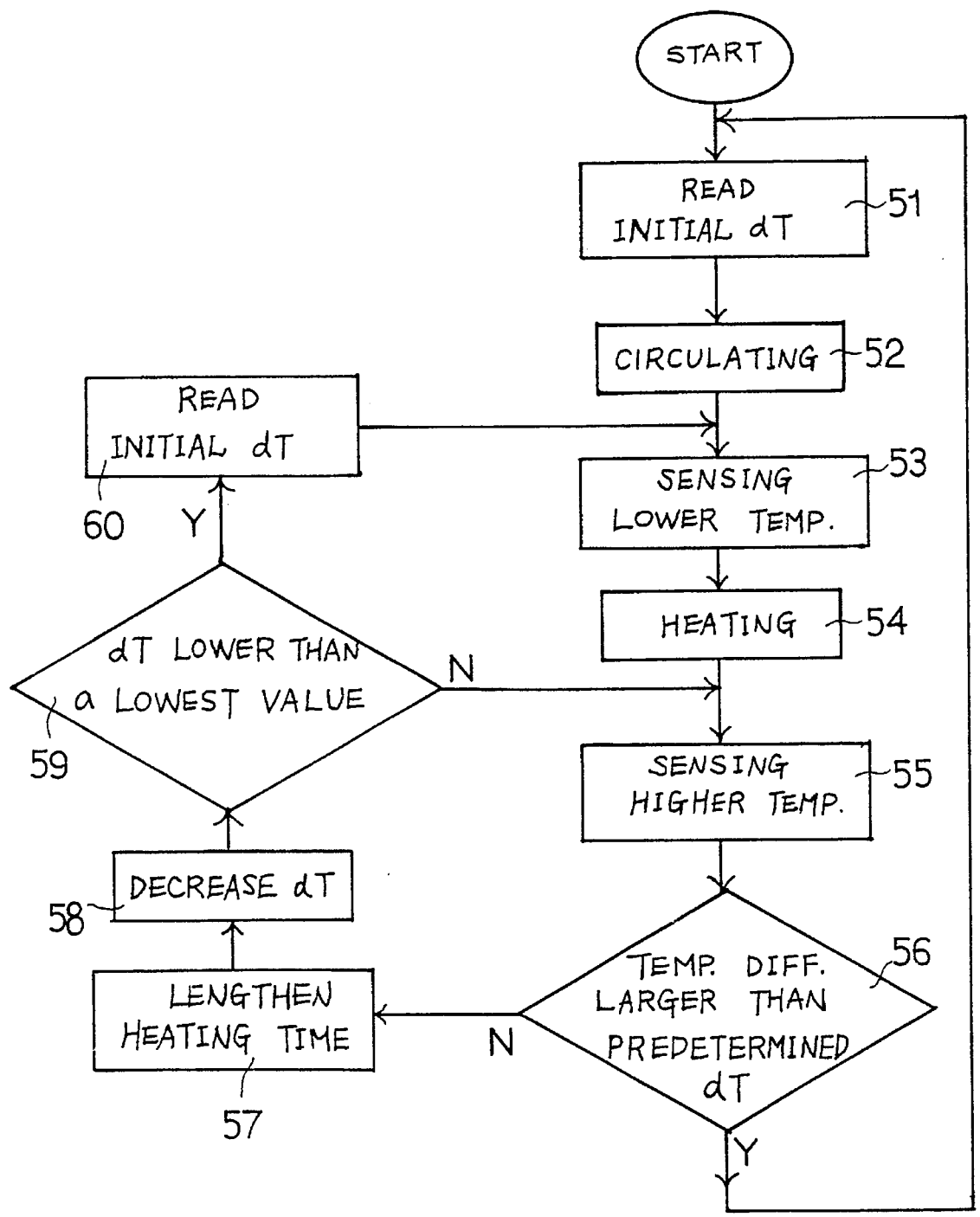
FIG. 2 is a flow chart illustrating the reasoning of the solar energy collecting system.

Referring next to FIG. 2, illustrated is the reasoning of the solar energy collecting system. When the solar energy collecting system is started and when the CPU 40 is energized, the CPU 40 may read the initial value of the temperature difference (process 51) and then may start the pump 30 so as to circulating the water and so as to pump the water collected in the water tank 10 to the solar collector 20 (process 52). The operation time of the pump 30 may be determined according to the water quantity received in the water tank. When the water flowing into the solar collector 20, the temperature sensor 21 may sense the lower temperature of the solar collector 20 (process 53). The water pumped into the solar collector 30 may then be heated by the solar energy so as to collect the solar energy (process 54). The heating time is initially predetermined by the most effective solar energy collecting time, which will be described hereinafter. After the water is heated for the predetermined heating time, the sensor 21 may sense the higher temperature (process 55). The higher temperature is then compared with the lower temperature obtained in the process 53 so as to determine a temperature difference (abbreviated as dT hereinafter) (process 56).

When the temperature difference dT obtained in process 56 reaches the predetermined temperature difference dT, i.e., when the water has been heated to a suitable temperature, the CPU may process to read the initial dT (process 51) again so as to start another heat energy collecting cycle. However, if the temperature difference dT obtained in process 56 does not reach the predetermined temperature difference dT, i.e., when the water can not be heated to a suitable temperature, the CPU may process to lengthen the heating time (process 57) so as to lengthen the heating time of the solar collector 20 such that the solar collector 20 may have much time to collect the solar energy that is worth collecting. At this moment, the CPU may also decrease the temperature difference dT to a lower value (process 58) so as to suitably collect the solar energy that is worth collecting. The water in the solar collector may then be heated with the lengthened heating time and with the decreased temperature difference dT; i.e., the requirement of heating is decreased. When the decreased temperature difference dT is larger than a predetermined lowest value, 5° C. for example, the CPU may process to the process 55 again. If the water is heated to a temperature that reaches the decreased dT, i.e., if the water has been heated to a temperature with the lowered requirement, the CPU may process to process 51 in order to circulate the water and in order to collect the heated water that is worth collecting. If the dT is lower than the predetermined lowest value, the CPU may process to read the initial value of the temperature difference (process 60) and to sense the lower temperature (process 53) again. It is to be noted that the pump 30 is not actuated at this moment so as to save energy and so as to avoid unwanted circulation. If the water can not be heated to the lowered requirement, the heating time may be increased step by step, and the dT may be decreased step by step until the dT is lower than the predetermined lowest value. When the sun shines on the solar collector again, the sensor 21 may sense the higher temperature (process 55) so as to proceed to process 51 again and so as to start the circulation cycle again.

Generally speaking, the initial heating time is preferably determined by the sun shine which directly acts on the solar collector at noon, and is preferably predetermined as 15 minutes; i.e., the water may effectively absorb the solar energy and may be heated to a suitable temperature within 15 minutes. The heating time is preferably lengthened step by step. For example, the heating time is increased by three minutes each. The initial value of the temperature difference is also preferably determined by the water that may be heated to the best temperature when the sun shine directly acts on the solar collector at noon, and is preferably predetermined as 30° C. The temperature difference dT is also preferably decreased step by step. For example, the temperature difference is decreased by 3° C. each. When the water is heated to a 30 degrees temperature difference within 15 minutes, the pump may be energized to circulate the heated water and to collected the heated water in the water tank. The water may be heated up to 60° C. at noon and up to about 45° C. in the morning and in the evening.

It is to be noted that the water heated to a 10 degrees temperature difference within 30 minutes may also be circulated in order to suitably collect solar energy, when the sun shines on the solar collector with suitable inclination and particularly after three o'clock P.M. Accordingly, the solar energy may be effectively collected by the collecting system.

When the water pumped into the solar collector 20 has a temperature greater than that of the water received in the solar collector 20, or when the water temperature in the water tank 10 is greater than that of the solar collector 20, the CPU 40 may stop the pump 30 in order to prevent the hotter water from pumping into the solar collector.

It is to be noted that a single temperature sensor is arranged in the most important position so as to effectively control the water circulation of the system. The temperature sensor 21 may sense the water flowing into the solar collector 20. In addition, the temperature 21 is located close to the solar collector 20 such that the sensor 21 may also sense the temperature of the heated water in the solar collector. The CPU may lengthen the heating time of the solar collector and may decrease the temperature difference dT in order to collect the water that is heated with longer time and with a lower temperature difference. The CPU may turn off the pump when water of higher temperature is pumped into the solar collector. When at noon, the water may be pumped in a fast speed in order to effectively collect the solar energy.

Accordingly, the solar energy collecting system in accordance with the present invention may effectively collect the solar energy.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solar energy collecting system comprising:

at least one water tank for receiving water therein, at least one solar collector for collecting solar energy and for heating the water to a heating temperature, a pipe coupling said water tank to said solar collector for supplying water from said water tank to said solar collector, a pump for pumping water from said water tank to said solar collector, a hose coupling said solar collector to said water tank for receiving heated water in said water tank from said solar collector, a temperature sensor engaged in said pipe and arranged close to said solar collector for sensing a water temperature of the water flowing from said water tank to said solar collector and for sensing the heating temperature of the water, and a processing means connected to said temperature sensor for receiving the water temperature and the heating temperature from said temperature sensor and for determining a first temperature difference by deducting the water temperature from the heating temperature, said processing means including an initial temperature difference and including a temperature difference decreasing value so as to decrease said initial temperature difference step by step and so as to determine a second temperature difference, said processing means being connected to said pump for operating said pump and for pumping the water into said solar collector when said first temperature difference reaches said second temperature difference.

2. A solar energy collecting system according to claim 1, wherein said processing means includes an initial heating time and includes a heating time increasing value for lengthening said initial heating time step by step when said first temperature difference is less than said second temperature difference.

* * * * *